Feb. 1, 1927.

F. N. DELAVAN

DOGGING MEANS FOR VEHICLE DOOR LATCHES

Filed Oct. 3, 1925

1,615,829

INVENTOR
Frederic N. Delavan
by John H. Roney
his Atty

Patented Feb. 1, 1927.

1,615,829

UNITED STATES PATENT OFFICE.

FREDERIC N. DELAVAN, OF PITTSBURGH, PENNSYLVANIA.

DOGGING MEANS FOR VEHICLE DOOR LATCHES.

Application filed October 3, 1925. Serial No. 60,196.

My invention relates to improvements in devices to prevent the door or doors of a vehicle such as a carriage or automobile from being opened from the outside. Specifically the invention relates to dogging means for vehicle doorlatches. Heretofore so far as I am aware, when a driver or owner of a vehicle upon leaving the same found it necessary to close the doors to prevent anyone from entering the same or stealing its contents he was required to operate several members to produce this result. The object of the present invention is to produce a simple, cheap and readily operated means which will automatically operate to prevent the knob shank of the door which actuates the latch bolt from being turned, and thus prevents the door from being opened when the mechanism is in operative position.

I accomplish this object by means of the device which broadly stated, consists of the window glass usually seated in the upper section of the door, or any other equivalent member relatively positioned in the door or with relation to the door. The said glass or member having on its lower edge a projection adapted to engage or contact with a corresponding projection mounted or carried upon the inner end of the knob spindle when the glass or equivalent member is in elevated position or in position closing the orifice in the upper section of the door. The said device is hereinafter more specifically described, reference being had to the accompanying drawings forming part hereof in which:

Figure 1:
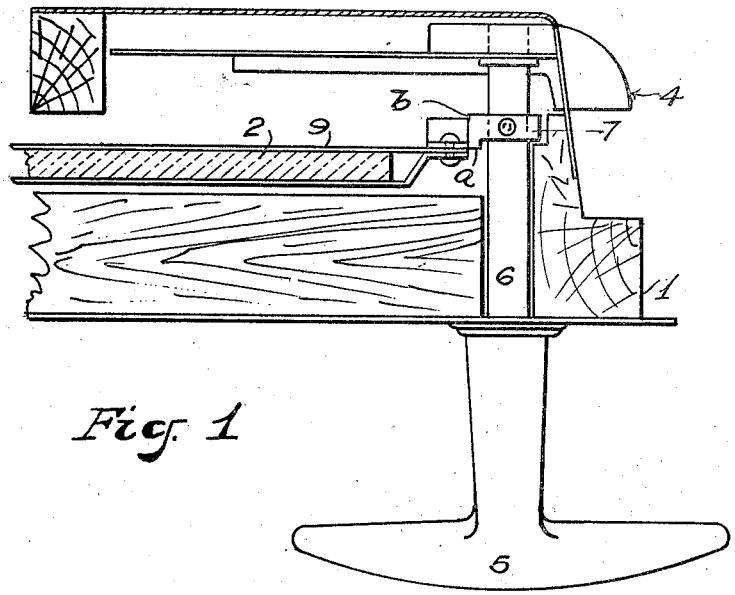
Fig. 1, is a transverse section of the door and vertically movable window pane on a line above the knob spindle of the lock.
Figure 2:
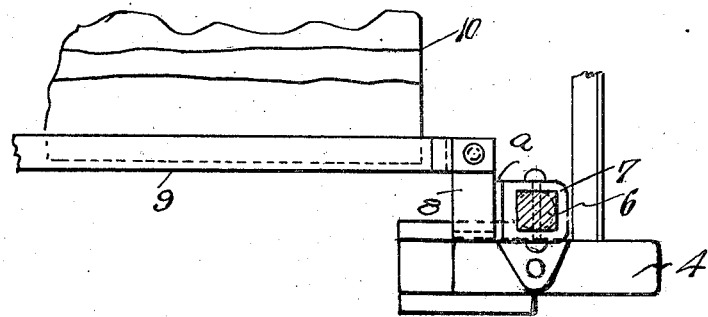
Fig. 2 is a section on Figure 1, immediately to the rear of the movable window.

Referring to the drawings, 1, is the usual door of a vehicle such as an automobile or carriage having a vertically movable window 2, adapted to close or control the opening in the upper section of the door. 4, is a latch bolt which is adapted to be actuated by turning the knob 5, on the outer end of the knob spindle 6, the inner end of the said spindle 6 being square in cross section and has mounted thereon the member 7, having a projection $a$ laterally extending therefrom and adapted to engage against the corresponding edge $b$ of the member 8, which is suitably secured to the lower end of the frame 9, in which the glass 10, of the vertically movable window is seated. The operation of the device is as follows: The driver or owner of the vehicle upon leaving the same moves the window frame into closed position in the usual manner, the frame in its upward movement brings the member 7, secured upon the lower edge thereof into engagement with or against the corresponding edge of the member 6, mounted upon the knob spindle of the door, and thus prevents the knob or spindle from turning and holding the door in closed position. Some of the advantages of my invention are its simplicity and cheapness, it obviates the necessity of actuating a number of elements as in the usual practice of accomplishing this result, it effectually prevents ingress to the car during the absence of the driver or owner, and consequently secures the contents of the car and the car itself against theft.

Having described my invention what I claim and desire to secure by Letters Patent is:

1. In means for preventing the door of a vehicle being opened from the outside, the combination of the door, the upper section of which is provided with a vertically movable member a latch having a knob spindle, a member mounted upon the inner end of said spindle, a member secured upon the edge of the vertically movable member of the door adapted to engage the edge of said member on said spindle when said vertically movable member is in elevated position, and thus prevent the rotation of the spindle and the actuation of the latch.

2. In means to hold the handle of a vehicle door stationary the combination of the door having a vertically movable member controlling the opening in the upper section of said door, the said vertically movable member having on its lower edge a projection; a latch having a knob spindle, the inner end of which is square in cross section, and a laterally projecting member securely mounted on said spindle adapted to engage against the lateral projection on the vertically movable member of the door when the said member is in elevated position whereby the knob spindle is held stationary and the latch bolt held in locked position.

In testimony whereof, I have hereunto signed my name.

FREDERIC N. DELAVAN.